US008554592B1

(12) United States Patent
Merz (10) Patent No.: US 8,554,592 B1
(45) Date of Patent: Oct. 8, 2013

(54) SYSTEMS AND METHODS FOR TRANSACTION-BASED PROFILING OF CUSTOMER BEHAVIOR

(75) Inventor: Chris Merz, Ballwin, MO (US)

(73) Assignee: MasterCard International Incorporated, Purchase, NY (US)

( * ) Notice: Subject to any disclaimer, the term of this patent is extended or adjusted under 35 U.S.C. 154(b) by 2127 days.

(21) Appl. No.: 10/800,875

(22) Filed: Mar. 15, 2004

Related U.S. Application Data

(60) Provisional application No. 60/454,408, filed on Mar. 13, 2003.

(51) Int. Cl.
*G06Q 10/00* (2012.01)

(52) U.S. Cl.
USPC .................... 705/7.11; 705/7.29; 705/7.31

(58) Field of Classification Search
None
See application file for complete search history.

(56) References Cited

U.S. PATENT DOCUMENTS

| 5,559,313 | A | * | 9/1996 | Claus et al. ..................... 705/30 |
| 5,761,647 | A | * | 6/1998 | Boushy .......................... 705/7.29 |
| 5,842,185 | A | * | 11/1998 | Chancey et al. ................. 705/40 |
| 5,930,764 | A | * | 7/1999 | Melchione et al. ........... 705/7.29 |
| 5,966,695 | A | * | 10/1999 | Melchione et al. ........... 705/7.33 |
| 6,119,933 | A | * | 9/2000 | Wong et al. ..................... 235/380 |
| 6,223,215 | B1 | * | 4/2001 | Hunt et al. ....................... 709/217 |
| 6,298,330 | B1 | * | 10/2001 | Gardenswartz et al. ... 705/14.25 |
| 6,327,574 | B1 | * | 12/2001 | Kramer et al. ............... 705/14.66 |
| 6,334,110 | B1 | * | 12/2001 | Walter et al. ................ 705/14.41 |
| 6,415,262 | B1 | * | 7/2002 | Walker et al. ............... 705/14.25 |
| 6,430,539 | B1 | * | 8/2002 | Lazarus et al. ................ 705/7.31 |
| 6,466,975 | B1 | | 10/2002 | Sterling ......................... 709/223 |
| 6,513,018 | B1 | | 1/2003 | Culhane ........................... 705/35 |
| 6,622,126 | B1 | * | 9/2003 | McArdle et al. ............... 705/7.33 |
| 6,837,436 | B2 | * | 1/2005 | Swartz et al. ............. 235/472.02 |
| 6,910,017 | B1 | * | 6/2005 | Woo et al. ...................... 705/7.29 |
| 6,917,922 | B1 | * | 7/2005 | Bezos et al. ................. 705/26.81 |
| 6,947,902 | B2 | * | 9/2005 | Shah et al. .................... 705/7.33 |
| 6,954,758 | B1 | * | 10/2005 | O'Flaherty .................... 707/802 |
| 7,013,290 | B2 | * | 3/2006 | Ananian ..................... 705/26.42 |
| 7,092,892 | B1 | * | 8/2006 | Sobalvarro et al. ............... 705/5 |
| 7,356,490 | B1 | * | 4/2008 | Jacobi et al. ..................... 705/27 |
| 7,680,685 | B2 | * | 3/2010 | Ouimet et al. ................ 705/7.31 |
| 2002/0004754 | A1 | * | 1/2002 | Gardenswartz et al. ......... 705/26 |
| 2002/0178052 | A1 | * | 11/2002 | Beyer et al. ...................... 705/14 |

(Continued)

OTHER PUBLICATIONS

Bounsaythip C and Rinta-Runsala E (2001). Overview of Data Mining for Customer Behavior Modeling. VTT Information Technology. pp. 1-59. File was protected; see http://virtual.vtt.fi/virtual/datamining/publications/customerprofiling.pdf.*

(Continued)

*Primary Examiner* — Brett Feeney
(74) *Attorney, Agent, or Firm* — Baker Botts L.L.P.

(57) ABSTRACT

A system and method is provided for updating customer profiles based on current information on merchant transactions performed by the customers. The customer profiles, which include data fields for customer attributes, are stored in a profile data base. The customer profiles may be updated when a batch of merchant-customer transaction reports in a given time period becomes available. The information in the batch of merchant-customer transaction reports, which may be supplemented with additional known information on the merchants and/or customers, is sorted by customer account number. The customer profiles then are updated, one customer account number at time, using the sorted information. Profiling models which relate transaction types or characteristics to customer attributes are used to assign updated values to the customer attribute data fields.

29 Claims, 4 Drawing Sheets

(56) References Cited

U.S. PATENT DOCUMENTS

| | | | |
|---|---|---|---|
| 2002/0178166 A1* | 11/2002 | Hsia | 707/100 |
| 2003/0061132 A1* | 3/2003 | Yu et al. | 705/30 |
| 2003/0074298 A1* | 4/2003 | Daum | 705/37 |
| 2003/0132298 A1* | 7/2003 | Swartz et al. | 235/472.02 |
| 2003/0177054 A1* | 9/2003 | Reinbold et al. | 705/10 |
| 2004/0133474 A1* | 7/2004 | Tami et al. | 705/16 |
| 2005/0071223 A1* | 3/2005 | Jain et al. | 705/14 |
| 2005/0125348 A1* | 6/2005 | Fulton et al. | 705/40 |
| 2005/0273377 A1* | 12/2005 | Ouimet et al. | 705/10 |

OTHER PUBLICATIONS

"Digital Connexxions Awarded U.S. Patent for its Innovative Predictive Marketing Technology," Press Release, Feb. 18, 2003, http://www.dconx.com/news.html.

* cited by examiner

- 310: Prepare transaction data file for cardholder account
- 320: Augment transaction data file
- 330: Input augmented transaction data file in profile update module
- 340: Retrieve pre existing profile for cardholder
- 350: Access cardholder account data
- 365: Retrieve profiling models
- 370: Update retrieved profile by applying model to transaction data file
- 380: Store updated cardholder profile

FIG. 3

Table. The profiling event loop algorithm.

```
LET transactionBatch = the extracted and transformed batch of
                       transactions over a specified period of
                       time (sorted by account_num)
    profileDW      = the collection of existing profiles
                       (sorted by account_num)
    accountDW      = the (optional) data set of available account
                       information (sorted by account_num)
    modelDW        = contains the logic for initializing, updating,
                       scoring, and outputting profile variables for
                       active set of models MERGE transactionBatch, profileDW, and accountDW
BY account_num FOR (each record in the merge data set)
     FOR (each active model)
       APPLY (the model code segments):

(1)   initialize the profile if it is new
       (2)   update the profile according to the previous version
             of the profile and information in the current
             transaction
       (3)   score the profile
       (4)   output the profile
```

FIG. 4

SYSTEMS AND METHODS FOR TRANSACTION-BASED PROFILING OF CUSTOMER BEHAVIOR

CROSS-REFERENCE TO RELATED APPLICATION

This application claims the benefit of U.S. provisional patent application No. 60/454,408, filed on Mar. 13, 2003.

BACKGROUND OF THE INVENTION

Business entities commonly use their customers' profiles as a basis for marketing or other business actions. For example, business actions such as targeted marketing mailings, generating opportunities for cross-selling, loyalty modeling and fraud detection are advantageously based on profiles of customer behavior or preferences. Using conventional profiling methods, the customer profiles are developed by first accumulating customer information in data warehouses. The information in the data warehouses may be accumulated over months or years. The data warehouses then are intermittently accessed to analyze the accumulated customer information for developing the customer profiles. Data mining techniques may be employed to find useful or actionable knowledge in the data warehouses for initiating targeted marketing. See e.g., "The Man who knows Too Much," Forbes, Nov. 11, 2002. Further, for example, Culhane U.S. Pat. No. 6,513,018 B1, which is assigned to Fair, Isaac and Company Inc., San Rafael, Calif., describes a data mining technique, which can be used to obtain customer credit scores from historic customer performance data stored in databases. However even with all available data mining techniques, it is difficult to extract actionable knowledge from the data warehouses in a timely manner. The difficulty may at least in part stem from the awkward or varied formats that historically have been used to store customer information in the data warehouses. Further, the customer profiles obtained by conventional profiling methods are stale as they are often based on antiquated information, which is accumulated in the data warehouses. Use of stale customer profiles can lead to inefficient or unproductive business actions such as improperly targeted marketing actions.

In the context of Internet commerce, Sterling U.S. Pat. No. 6,466,975 B1 ("Sterling"), which is assigned to Digital Connexxions Corp., Oakville, Calif., describes use of an artificial intelligence system for personalized marketing efforts directed toward repeat visitors to an Internet web site. As described by the assignee, Sterling's artificial intelligence system may be used to dynamically tailor marketing efforts by learning from the responses of the web site visitors to previous marketing efforts. See e.g., "Digital Connexxions Awarded U.S. Patent for its Innovative Predictive Marketing Technology," Press Release, Feb. 18, 2003, http://www.d-conx.com/news.html.

Consideration is now being given to ways of enhancing systems and methods for customer profiling to obtain more current and timely customer profiles. In particular, attention is directed to systems and methods for developing timely customer profiles based on current credit card transactions performed by the customers.

SUMMARY OF THE INVENTION

In accordance with the present invention, systems and methods for transaction-based profiling of customers are provided.

Preexisting profiles of the customers are stored in a profile database or warehouse. The customer attributes in the profiles are related to transaction information using suitable profiling models. Using the inventive systems and methods, the profiles are updated on a rolling basis, for example, as a customer-merchant transaction report or a series of customer-merchant transactions reports are received in batches. The transaction information in a received batch may be supplemented with additional known information on the merchants or transaction types. Further, the transaction information in the received batch is sorted by customer account number and assembled in a transaction data file for processing. Preexisting profiles of the customers are retrieved from the profile database and merged with the transaction data file by account number. The transaction data file is then processed iteratively by account number in a profile-updating step, to update the customer profiles.

Preferably, the method of the present invention comprises preparing a transaction data file including information on transactions performed by a customer with merchants in a given time period, the transaction data file preferably including transaction reports containing information on the transactions performed by the customers and on the merchants involved in the transactions.

The method further comprises retrieving a profile on the customer including one or more attributes that are of interest, such as may be related to geographic, demographic or behavioral characteristics of the transaction cardholder.

The method of the present invention further comprises updating the customer profile by assigning a value to the attribute data field by applying a profiling model, which bases the value on transaction information and the retrieved profile.

Preferably, the method further comprises assigning a confidence level value to the assigned value of the attribute data field, and updating the confidence level value by similarly applying said profiling model.

Further features of the invention, its nature and various advantages will be more apparent from the accompanying drawings and the following detailed description.

DETAILED DESCRIPTION OF THE INVENTION

The present invention is described in the context of the credit card transactions with the understanding that the inventive principles of the present invention are applicable to other types of transactions and customer information data, which may be recorded or reported in a timely or regular manner. Systems and methods for real time transaction-based profiling of customers are disclosed.

In an exemplary application, a credit card issuer may use the systems and methods of the present invention to regularly monitor and analyze credit card transactions as a credit cardholder completes a transaction or series of transactions. The systems and methods may include suitable models to characterize the transaction data and to obtain a rolling profile of each credit cardholder's behavior or preferences. The rolling profile may include an updated summary of the cardholder's behavior and preferences based on the credit card transactions, which have been reported and analyzed to date. The rolling profile may contain time-sensitive behavioral information, which may be advantageously acted upon to initiate targeted marketing or other responsive business actions. For example, a rolling profile may contain behavioral information such as "three purchases were made within one month from vendors within the 'jewelry and giftware' category," "the average purchase amount for this cardholder is $52," "this cardholder is interested in sports," etc. The rolling profiles also may include up-to-date estimates of the credit cardholder's home zip code, age, gender, income, and other demographic characteristics or attributes.

The credit cardholders' profiles may be stored in accessible profile data warehouses so that the profiles can be readily retrieved and updated frequently. The profiles may be stored as either fixed or variable length formatted data records. The data records may include data fields that correspond to one or more profile variables or attributes that are of interest. The profile variables or attributes may, for example, be related to the geographic, demographic or behavioral characteristics of the credit cardholders. The data records also may include data fields, which correspond to statistical measures of belief or confidence associated with the assigned values of the other profile variables or attributes. An exemplary "Gender" profile data record includes the attribute and attribute value pair "Gender: Female," and an associated confidence value (e.g., "0.87"), which indicates the degree of confidence that the gender of the credit cardholder is female. The data fields in a profile data record may be updated each time a transaction or a series of transactions by the credit cardholder is reported and analyzed. Any suitable piece of information or data in a transaction report may be used to modify or update a profile.

Figure 1:
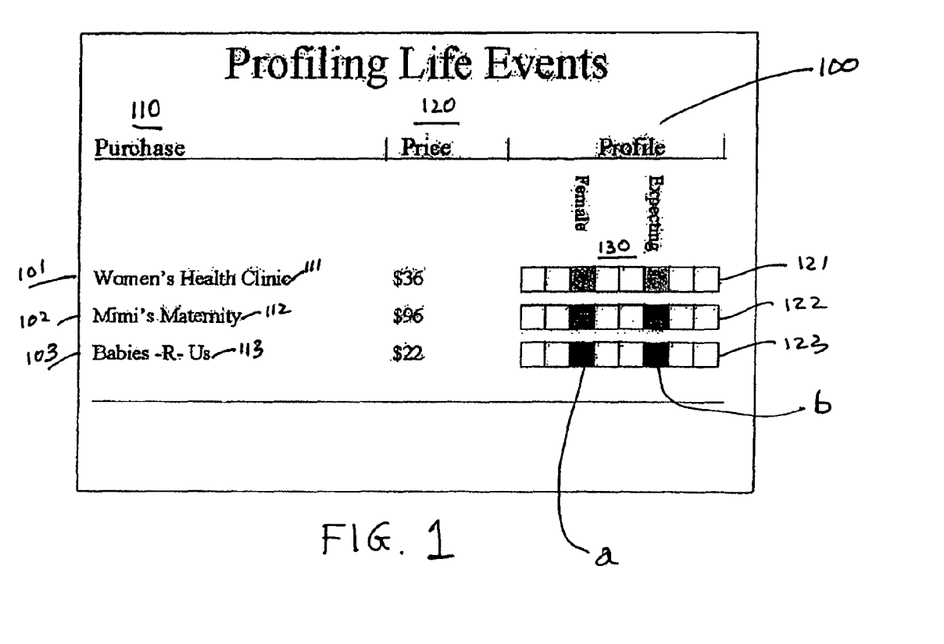
FIG. 1 is a schematic diagram illustrating the manner in which information in transaction reports can be modeled to predict customer attributes for customer profiling, in accordance with the present invention.

The manner in which data in a transaction report is used to update a cardholder's profile can be understood with reference to FIG. 1. FIG. 1 shows data fields from a series of reported credit card purchase transactions 101-103 made by the credit cardholder, and data fields of the cardholder's profile 100. Column 110 in FIG. 1 lists merchants 111-113 where each of the purchase transactions 101-103 was made. Further column 120 in FIG. 1 lists the dollar amount involved in each of the purchase transactions 101-103.

Cardholder profile 100 has a fixed format that includes data fields for two attributes (e.g., gender and pregnancy status) and for the corresponding attribute values (e.g., "Female" and "Expecting", respectively). Cardholder profile 100 also has data fields for the level of confidence in the two attribute values. In FIG. 1, the levels of confidence in the two attribute values, "Female" and "Expecting," are indicated by the depth of shading in boxes a and b, respectively. Column 130 shows representations 121-123 of the confidence level data fields of cardholder profile 100 after it has been updated in response to each of transactions 101-103, respectively.

A suitable profiling model or logic may be used to relate transaction information to the attribute values or confidence levels in cardholder profile 100. For example, the degree of confidence in the two attribute values "Female" and "Expecting" may be changed by the profiling model or logic on consideration of the merchant types (Women's Health Clinic, Mimi's Maternity, and Babies-R-Us) in each of transactions 111-113. Merchants 111-113 may be classified using conventional industry codes or merchant categories (e.g., grocery="GRO", drug store chain="DSC", etc.). Alternatively or additionally, merchants 111-113 may be classified using custom classifications or models established for the purpose of profiling. For example, the first merchant, Women's Health Clinic, may be classified as OB/GYN by a custom classifier. The profiling model or logic may increase in the degree of confidence in the two attribute values "Female" and "Expecting" after each of transactions 111-113 according to their merchant classifications. This increase in the degree of confidence in the two attribute values is indicated in representations 121-123 by a corresponding increase in the depth of shading in boxes a and b. After the third transaction with merchants of the type in transactions 111-113, there is a high degree of confidence that the cardholder is a female and is expecting a child.

The profiling model or logic may assign values to some of the data fields in cardholder profile 100 that persist regardless of the type of future transactions performed by the cardholder. For example, the confidence level that the cardholder is "Female" may persist after transaction 113 even if future transactions by the cardholder do not involve merchants of the type shown in column 110. In contrast, the profiling model or logic may assign transitory values to some of the data fields. For example, the confidence level that the cardholder is "Expecting" may decay with time if the future transactions by the cardholder do not involve merchants of the type shown in column 110. The profiling model or logic may include a predetermined rate function by which the level of confidence gradually decays with the number of days $\delta$ after transaction 113.

It will be understood that in general, cardholder profile 100 may have any number of additional or alternate variables (data fields). Some of the profile variables may be alphanumeric variables, for example, account number and zip codes. Other profile variables may be numeric or date variables, for example, orig_date: the date the profile was first created, last_seen: the date of the last transaction observed, number_of_transactions: the total number of transaction in a transaction batch, and total_amount_spent: the total dollar amount spent. The profile variables may be used to generate or compute other variables as necessary or desired in the updating process. For example, a variable such as "number of days since the last transaction, $\delta$" may be computed as the difference in two date variables, $\delta$=transaction_date—last seen.

Figure 2:
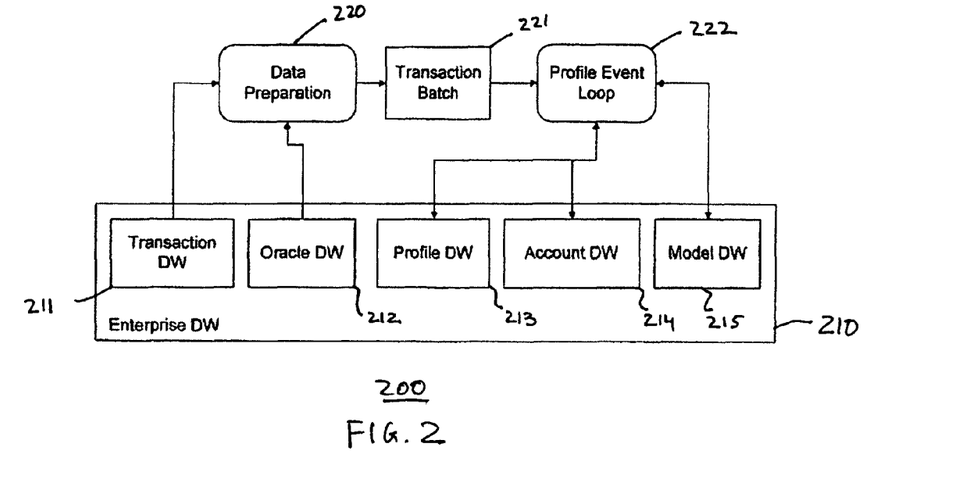
FIG. 2 is a block diagram illustrating the components of an exemplary system, which can be used for transaction-based customer profiling, in accordance with the present invention.
Figure 3:
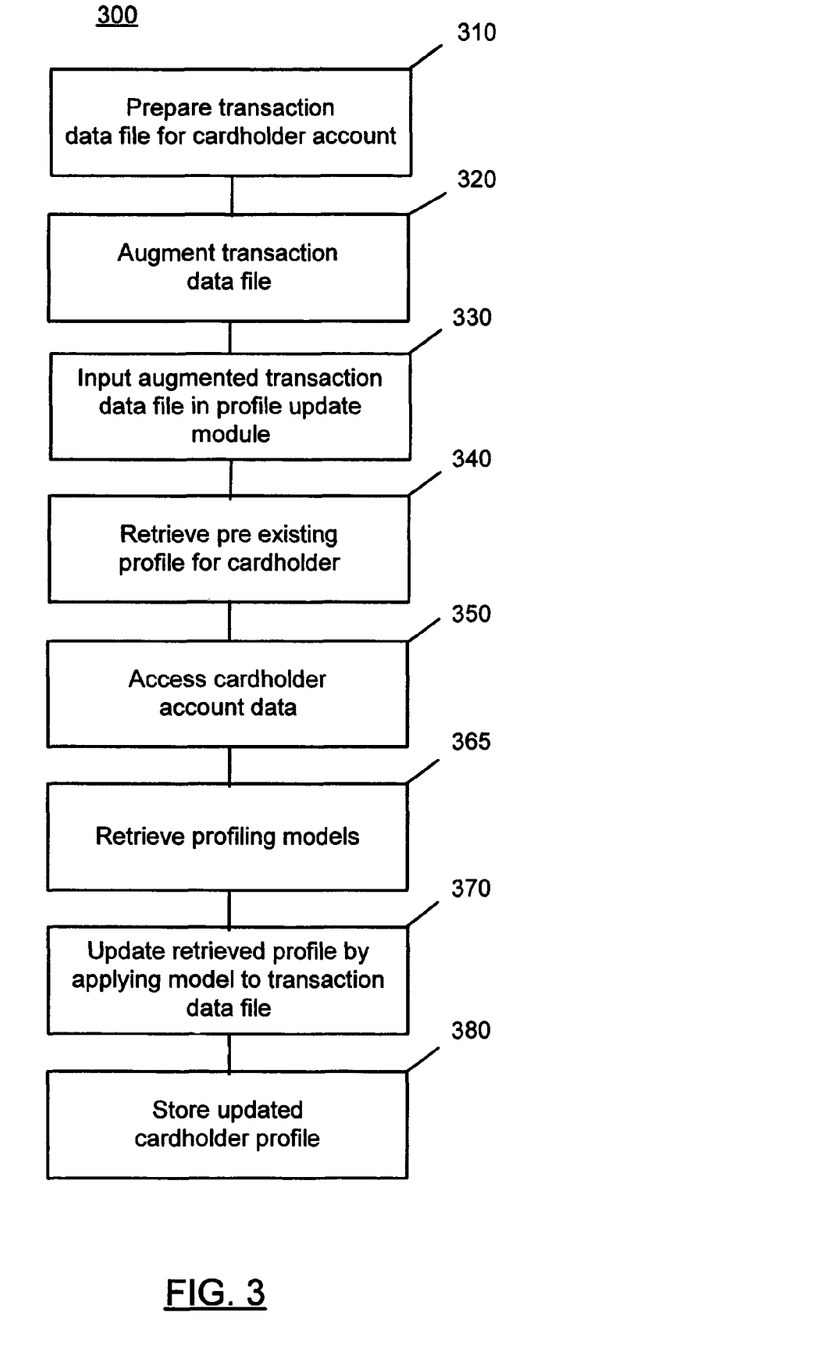
FIG. 3 is a flow chart illustrating the steps of an exemplary process for updating a customer profile, in accordance with the present invention.

FIG. 2 shows an exemplary system 200, which may be used to carry out a transaction-based profiling process (e.g., process 300 FIG. 3). System 200 includes an enterprise data warehouse 210 encompassing one or more transaction data stores (e.g., transaction data stores 211 and 212) and one or more customer data stores (e.g., profile data store 213, account data store 214, and model store 215). Transaction data store 211 may be a data warehouse for processed customer-merchant transaction reports. Transaction data store 212 may be a data warehouse for merchant account information maintained by the credit card issuer. Similarly account data store 214 may be a data warehouse for cardholder account information. Profile data store 213 may be a store in which preexisting profiles of the cardholders are stored, and model store 215 may be a store in which various models and logic for evaluating transaction data and updating cardholder profiles are stored. System 200 also includes a data preparation module 220, a transaction batch module 221, and a profile-modeling module 222. System 200 may be implemented using conventional computer hardware and application software configurations including, for example, distributed server systems. System 200 also may include other conventional hardware and software components that are not shown in FIG. 2 (e.g., user terminals and data warehouse query tools).

FIG. 3 shows some of the steps of an exemplary profiling process 300, which may be used in conjunction with system 200 to generate and update the profile of a credit cardholder having an account with a credit card issuer. With reference to FIGS. 2 and 3, at step 310 of profiling process 300, a transaction data file (e.g. transaction batch 221) is prepared for use in updating the cardholder profile. The transaction data file may be prepared, for example, in data preparation module 220, by querying and retrieving transaction reports associated with the cardholder's account number from transaction data stores 211 and/or 212. The retrieved transaction reports may span a suitable time period (e.g., a day, week, month or year). The suitable time period may correspond, for example, to the frequency at which the cardholder profile updates are desired or to a natural frequency (e.g., daily) at which transaction reports are received or assembled in transaction data stores 211 and/or 212. Alternatively or additionally, at step 310 transaction reports may be received at data preparation module 220 in real-time directly from reporting merchants.

Next at optional step 320, the received or retrieved transaction reports may be supplemented or augmented with additional known information. For example, transaction reports that identify a merchant only by name or account number may be augmented with known information on the merchant's geographic location or zip code. The additional known information may be retrieved from merchant account information which has been previously stored in a relational database (e.g., in store 212) by the credit card issuer.

The transaction data file (e.g., file 221) prepared at steps 310 and 320 is used to update the profile of the cardholder. At step 330, the transaction data file is input into a profile-updating module (e.g. module 222) for this purpose. At step 340, the previous profile of cardholder is retrieved (e.g., from profile data store 213) and made available to the profile-updating module. Also at optional step 350, a cardholder account data file may be made available to the profile-updating module.

At step 370, the profile-updating module processes the transaction data batch file and the optional cardholder account data file to update the previous profile of cardholder using suitable profiling algorithms and models. The suitable algorithms or models may be stored in profile-updating module or acquired from model store 215 at an optional preceding step 365. The profile-updating module may utilize the suitable profiling algorithms and models to update or score appropriate data fields in the previous profile of cardholder in response to specific information in the transaction data batch file (see e.g., FIG. 1). At step 380, the updated profile may be stored in profile store 213 and/or otherwise made available for inspection or review for prompt business action.

It will be understood that the particular sequence of steps 310-380 in process 300 has been described herein only for purposes of illustration. The steps of process 300 may be performed in any other suitable sequence or concurrently. Further, some of the described steps may be omitted and/or new steps may be added to process 300 as appropriate, for example, in consideration of the types of data processed or the types profile updates desired. Process 300 may, for example, be suitably modified to update profiles for several cardholder account numbers in a batch process.

Figure 4:
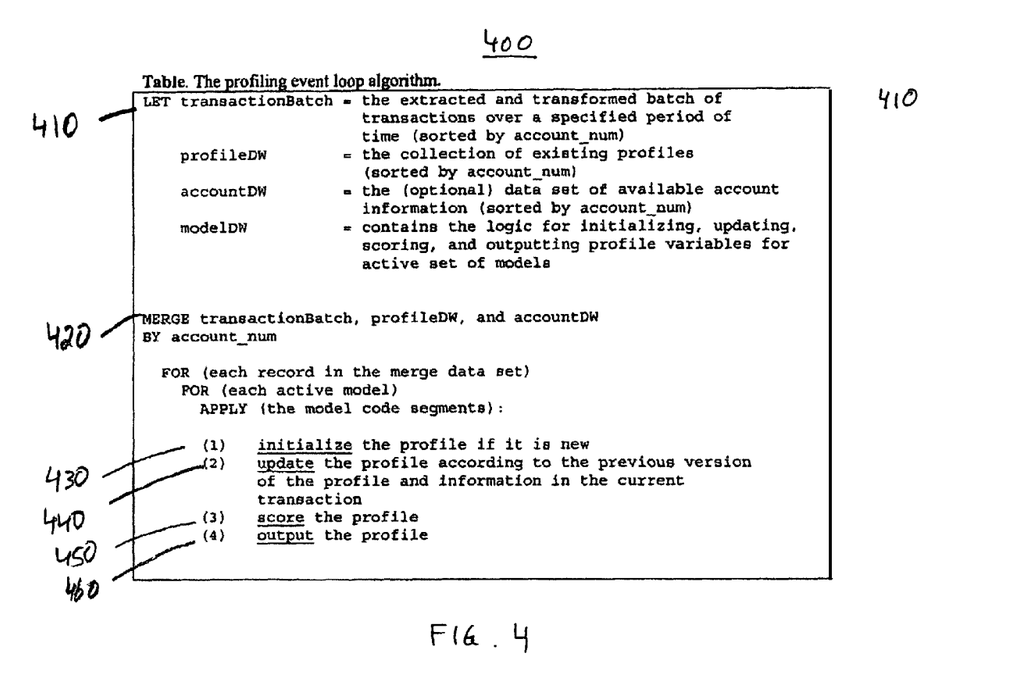
FIG. 4 is a schematic representation illustrating the logic of an algorithm that can be used to iteratively update several customer profiles in a batch process, in accordance with the present invention.

FIG. 4 shows an exemplary algorithm 400 that may be used to iteratively update several cardholder profiles, one account number at a time, in a batch process using a batch of transaction data. Algorithm 400 may be implemented, for example, in profile-updating module 222, using any suitable conventional software and/or data management tools including common data management tools sold by vendors such as SAS Institute Inc., 100 SAS Campus Drive, Cary, N.C., and Corworks, 35 Sixth St., Stamford, Conn.

Algorithm 400 may be run or performed at convenient intervals, for example, daily, to update all the cardholder profiles in the card issuer's customer base. Algorithm 400 first merges transaction data, cardholder profile data, and account data from respective data warehouses or stores (e.g., FIG. 2 stores 211-214). Algorithm 400 then applies the logic of available models (e.g., FIG. 2 store 215) to the merged data to update the credit cardholder profiles, one account number at a time.

With reference to FIG. 4, at step 410 a batch of transaction data is prepared and augmented, for example, in the manner described above for steps 310 and 320 in process 300. An augmented batch of transaction data may, for example, include information for the following variables: cardholder account number (account), dollar amount of transaction (amount), number of items purchased (count), industry type (industry), transaction processing date (inetdate), merchant location identification (loc_id), merchant code (mcc), merchant zip code (mzip), and transaction date (transdate). Further at step 410, the batch of augmented transaction data is sorted or indexed by cardholder account number. The batch of augmented transaction data also may be sorted by alternate or additional variables (e.g., by transaction date).

Table 1 shows an exemplary sample of a batch of augmented transaction data, which has been sorted by cardholder account number and by transaction date at step 410.

TABLE 1

Sample batch of transaction data, after it has been augmented with industry and mzip.

| Account | Amount | Count | Industry | Inetdate | Loc_id | MCC | mzip | Transdate |
|---------|--------|-------|----------|----------|--------|-----|------|-----------|
| 12345 | 23.77 | 1 | DSC | 4/07/01 | 0241409730 | 5912 | | 15070 |
| 12345 | 59.95 | 1 | NSX | 4/10/01 | 0247583388 | 5968 | 06850 | 15074 |
| 12345 | 151.01 | 1 | TER | 5/15/01 | 0243204511 | 5812 | | 15108 |
| 12345 | 28.04 | 1 | AAF | 5/28/01 | 0238530157 | 5999 | 94133 | 15121 |
| 12345 | 57.37 | 1 | TER | 5/28/01 | 0249025657 | 5812 | | 15121 |
| 54321 | 177.50 | 1 | TEH | 7/03/01 | 0249689799 | 7011 | | 15156 |
| 54321 | 325.71 | 1 | HIC | 7/04/01 | 0249652161 | 1711 | 99518 | 15158 |
| 54321 | 29.15 | 1 | HIC | 7/04/01 | 0251459756 | 5251 | 99501 | 15158 |
| 54321 | 28.00 | 1 | TER | 7/05/01 | 0249658967 | 5812 | | 15160 |
| 54321 | 130.38 | 1 | GRO | 7/05/01 | 0251464553 | 5422 | 99518 | 15159 |

The sorting of the augmented transaction data by account number at step 410 advantageously enables all transactions for an account number to processed by algorithm 400 in one batch.

With renewed reference to FIG. 4, existing profile data and optional account data also are similarly sorted or indexed by account number at step 410. All of the sorted data records then are merged by account number at subsequent step 420. The merged data is then processed through steps 430 to 460 one account number at a time to update the cardholder profiles associated with the account numbers. At step 430, a new profile is initialized in case there is no preexisting profile associated with the account number under consideration. At step 440, attribute values in the cardholder profile are updated according to information in the transaction data. Algorithm 400 may utilize one or more models (designated as active models) to update the attribute values in the cardholder profile. The active models may be suitably selected for use according to the type of profile updates desired, for example, for specific business activities or actions. The active model may be selected (e.g., at step 410) from model store 215. At step 450, algorithm 400 computes or scores revised confidence levels for the attribute values in the updated cardholder profile. The confidence levels may be revised for all of the attribute values in the updated profile including those that are not changed at step 440. The scored and updated cardholder profile is output at step 460.

An exemplary logical implementation of steps 440 and 450 of algorithm 400 to update and score attribute values in a profile is described herein with reference to an illustrative "Gender Model." The Gender Model may be used to update a gender attribute value in a profile similar to that previously described with reference to FIG. 1. The Gender model utilizes a previously established model co-relation between merchant categories (i.e. mcc) and the gender of the typical customers (i.e., male or female) in the merchant categories. The model co-relation may be established empirically or by market research using, for example, historical data or market surveys tracking the ratio of males/females ("gender ratio") that frequent each mcc. The model co-relation may be stored in a lookup table (e.g., "mccGendertable (mcc)") listing each mcc and its associated gender ratio ("GenderScore"). At step 440 of algorithm 400, each transaction record for the account number under consideration is assigned a GenderScore corresponding to the merchant code (mcc) in the transaction record using the lookup table. Table 2 shows, for example, GenderScore values assigned to each transaction record listed in Table 1.

TABLE 2

Values of the intermediate variable,
GenderScore, for each transaction in Table 1.

| Inetdate | MCC | GenderScore |
|---|---|---|
| 04/07/01 | 5912 | 0.48 |
| 04/10/01 | 5968 | 0.61 |
| 05/15/01 | 5812 | 0.64 |
| 05/28/01 | 5999 | 0.46 |
| 05/28/01 | 5812 | 0.64 |
| 07/03/01 | 7011 | 0.62 |
| 07/04/01 | 1711 | 0.64 |
| 07/04/01 | 5251 | 0.69 |
| 07/05/01 | 5812 | 0.64 |
| 07/05/01 | 5422 | 0.52 |

Further at step 440 of algorithm, the Gender Model identifies transactions in the merged transaction record as those that are more likely to be made by males and those that are more likely to be made by females. Suitable statistical criteria using the GenderScores of the transactions may be used to identify transactions being made by males or females. A suitable statistical criterion is based on the results of a study in which the average GenderScore value for several merchant categories was found to be 0.54 (i.e. the probability that a customer is a male is on the average 54%). Using this statistical criterion, the Gender Model identifies and counts transactions having GenderScore values that are at least six points higher than the average value (i.e. >0.6) as being made by males ("nHiMale"). Similarly, transactions with GenderScore values that at least are six points lower than the average value (i.e. 0.48<) are identified and counted as being made by females ("nHiFemale"). Transactions having intermediate GenderScore values (i.e. between 0.48 and 0.6) are considered to be uncertain and not included in either count. This counting logic of the Gender Model is summarized by the following code LET GenderScore=mccGenderTable(mcc)
IF (GenderScore>0.6) THEN nHiMale=nHiMale+1
IF (GenderScore<0.48) THEN nHiFemale=nHiFemale+1.

After all the transactions associated with the cardholder under consideration have been identified and counted, the Gender Model may assign a "Male," or "Female" value to the gender attribute in the cardholder profile according to the final totals for nHiMale and nHiFemale. Further, the Gender Model may assign a value "Joint Account" when both the final totals are high. In a version of the Gender Model, the assigned gender value is calculated as a function of the difference parameter Gender_Score=nHiMale−nHiFemale. The Gender Model also may include suitable statistical criteria for assessing and assigning a confidence level to the assigned gender value.

Another exemplary model that may be used for updating profile variables is the "Aging Model." This model may be used to update a "period" or time-sensitive variable (e.g., pregnancy status) in the cardholder profile. The Aging Model uses a time function to compute an updated value of the period variable. The time function may, for example, change the value of the period variable to a steady state value (e.g., zero) if there is no transaction of a particular qualifying type reported within a stated time period. Conversely, the time function may reset or increment the value of the period variable if there is a transaction of the particular type reported within the stated time period. For example, a period or time-sensitive variable such as "number of grocery store purchases made in the last sixty days, x" may be updated using the following exponential decay time function $$x = xe^{-k\delta} + y$$

where y is 1 if the current transaction has a qualifying grocery industry code "GRO," or is 0 otherwise, $\delta$ is the number of days since the last qualifying transaction, a k is an aging constant, which may be selected so that x decays to about zero if $\delta$ exceeds a period of 60 days. The variable $\delta$ may be an internal model variable, which is not stored in the cardholder profile but is computed in algorithm 400 using other variables in the profile of the merged data record. For example, variable $\delta$ may be computed from date variables in the profile record, $\delta$=transaction_date—last seen.

Algorithm 400 may be logically configured so that all period or time-sensitive variables in a cardholder profile are reviewed and updated with each transaction considered in a transaction batch. This configuration ensures that all time-sensitive variables in the cardholder's profile are aged to at least the current time or date and ready for future updates.

Additionally, this configuration ensures that cardholder profiles with the most recent and up-to-date information are readily available for business review or action.

Case Study

A profiling case study demonstrates the industrial utility of transaction-based profiling systems and processes (like system 200 and process 300) in predicting the characteristics and preferences of a customer base. The case study involved demographic characteristics (e.g., gender) of credit cardholders. Historical account data records from a sample of 200,000 credit card accounts with a credit card issuer were obtained for the case study. The obtained data records included all transactions reported over a one-year period in the credit card accounts. The obtained data records first were cleansed of all personally identifying information such as names. The account records then were partitioned randomly by account number into to one of four sets—a training data set, a validation data set, a support data set and a test data set. The training data set was used to develop several empirical profile-updating models used in the case studies. The validation data set was used as an out-of-sample data set to test or adjust the models. The support data set was used to generate lookup tables (e.g., mccGendertable (mcc)) required by the profiling models (e.g., Gender Model). The test data set was used to conduct the transaction-based profile update simulations.

In the case study, the Gender Model, which was described earlier with reference to algorithm 400, was used to assign a Male or Female value to a gender attribute in each cardholder profile. A lookup table for assigning a customer gender-likelihood (GenderScore) to each merchant type (mcc) was constructed using the support data set. The look up table was employed to increment counters nHiMale or nHiFemale according to the GenderScore of each transaction record in the manner described previously in the context of algorithm 400. The two counters nHiMale or nHiFemale also were stored as profile variables for use in subsequent profile updates. The value of the difference parameter Gender_Score (=nHiMale−nHiFemale) for the final transaction in each account was recorded.

In the case study, the Gender Model was developed on the out-of-sample validation data set with known gender values. Various test Gender_Score threshold functions or rules were used to assign a Male or Female value to the profile gender attribute. A Gender_Score threshold rule, which was tested is, for example, given by if Gender_Score>1 then gender=Male, and if Gender_Score<−4 then gender=Female.

This test threshold rule successfully predicted the cardholder's gender with 71% accuracy and was statistically applicable to about 61.4% of the test data population. Table 3 lists the confidence levels in the gender assignments obtained using various Gender_Score threshold rules and the corresponding percentages of the test data population to which the Gender_Score threshold rules are applicable.

TABLE 3

Gendermodel performance at different confidence thresholds.

| Confidence Threshold | Percent of Population |
|---|---|
| 63 | 100.00% |
| 64 | 97.66% |
| 65 | 95.45% |
| 66 | 92.99% |
| 67 | 86.69% |
| 68 | 82.12% |
| 69 | 73.09% |
| 70 | 68.04% |
| 71 | 61.40% |
| 72 | 52.23% |
| 73 | 47.83% |
| 74 | 34.52% |
| 75 | 24.15% |
| 76 | 19.74% |
| 77 | 13.01% |
| 78 | 2.06% |

The results shown in Table 3 indicate that transaction-based profiling using, for example, a suitable gender model, can correctly predict the gender of the all of the cardholder population with a confidence level of at least 63%, which is substantially higher than a baseline confidence level of about 53% obtained by simple guessing.

Although the present invention has been described in connection with specific exemplary embodiments, it should be understood that various changes, substitutions, and alterations apparent to those skilled in the art can be made to the disclosed embodiments without departing from the spirit and scope of the invention.

We claim:

1. A method for transaction-based profiling of a customer, the method comprising:
    preparing a transaction data file comprising transaction data for transactions performed by a customer with merchants in a predetermined time period;
    obtaining a profile of said customer, said profile comprising a time-sensitive variable having a numerical value;
    periodically calculating an updated numerical value based on the numerical value of said time-sensitive variable obtained from said profile, a time function, and said transaction data;
    assigning using a specially programmed processor said updated numerical value to said time-sensitive variable;
    using said updated numerical value to identify at least one target customer having a predetermined characteristic; and
    transmitting a marketing communication to said at least one target customer, wherein said time function comprises an exponential decay time function defined as:

$$x = xe^{-k\delta} + y$$

wherein x is said time-sensitive variable, k is an aging constant, δ is a time variable based on a last qualifying transaction performed by the customer, and y is an incrementing variable.

2. The method of claim 1, wherein said time-sensitive variable comprises behavioral information.

3. The method of claim 1, wherein said time-sensitive variable comprises a confidence level.

4. The method of claim 1, wherein said time function decays the numerical value of said time-sensitive variable to a steady state numerical value when a qualifying transaction is not reported within a stated time period.

5. The method of claim 1, wherein said time function resets or increments the numerical value of said time-sensitive variable when a qualifying transaction is reported within a stated time period.

6. The method of claim 1, wherein k is chosen such that x decays to zero when δ exceeds a stated time period.

7. The method of claim 1, wherein said time-sensitive variable is updated with each of the transactions performed by the customer reflected in said transaction data file.

8. The method of claim 1, wherein said time-sensitive variable is updated with each of the transactions performed by the customer reflected in a transaction batch.

9. The method of claim 1, wherein preparing the transaction data file comprises:
receiving merchant transaction reports with merchant information from a merchant account data warehouse; and
augmenting said merchant transaction reports with said merchant information from said merchant account data warehouse.

10. The method of claim 1, wherein obtaining said profile of said customer comprises retrieving customer account information from a customer account data warehouse.

11. The method of claim 1, wherein obtaining said profile of said customer comprises creating a new customer profile for said customer.

12. A system for updating a profile of a customer of a business in a batch process, said system comprising:
one or more processors configured to prepare a transaction data file comprising transaction data for transactions performed by a customer with merchants in a predetermined time period;
said one or more processors further configured to obtain a profile of said customer, said profile comprising a time-sensitive variable having a numerical value;
said one or more processors further configured to periodically calculate an updated numerical value based on the numerical value of said time-sensitive variable obtained from said profile, a time function, and said transaction data; and
said one or more processors further configured to assign said updated numerical value to said time-sensitive variable,
wherein said time function comprises an exponential decay time function defined as:

$$x = xe^{-k\delta} + y$$

wherein x is said time-sensitive variable, k is an aging constant, δ is a time variable based on a last qualifying transaction performed by the customer, and y is an incrementing variable.

13. The system of claim 12, wherein said one or more processors are further configured to use said updated numerical value to identify at least one target customer having a predetermined characteristic.

14. The system of claim 13, wherein said one or more processors are further configured to transmit a marketing communication to said at least one target customer.

15. The system of claim 12, wherein said time-sensitive information comprises behavioral information.

16. The system of claim 12, wherein said time-sensitive variable comprises a confidence level.

17. The system of claim 12, wherein said one or more processors are further configured to store the updated profile in a profile database.

18. The system of claim 12, wherein said one or more processors are further configured to retrieve customer account information from a customer account data warehouse.

19. The system of claim 12, wherein said one or more processors are further configured to create a new customer profile for said customer.

20. The system of claim 12, wherein k is chosen such that x decays to zero when δ exceeds a stated time period.

21. A non-transitory computer readable medium encoded with a computer program that includes computer executable instructions for updating a profile of a customer of a business in a batch process, which when executed causes a processing system to perform the steps of:
preparing a transaction data file comprising transaction data for transactions performed by a customer with merchants in a predetermined time period;
obtaining a profile of said customer, said profile comprising a time-sensitive variable having a numerical value;
periodically calculating an updated numerical value based on the numerical value of said time-sensitive variable obtained from said profile, a time function, and said transaction data; and
assigning using a specially programmed processor said updated numerical value to said time-sensitive variable,
wherein said time function comprises an exponential decay time function defined as:

$$x = xe^{-k\delta} + y$$

wherein x is said time-sensitive variable, k is an aging constant, δ is a time variable based on a last qualifying transaction performed by the customer, and y is an incrementing variable.

22. The non-transitory computer-readable medium of claim 21 wherein the computer program further causes the processing system to perform the step of using said updated numerical value to identify at least one target customer having a predetermined characteristic.

23. The non-transitory computer-readable medium of claim 22 wherein the computer program further causes the processing system to perform the step of transmitting a marketing communication to said at least one target customer.

24. The non-transitory computer-readable medium of claim 21 wherein the computer program further causes the processing system to perform the step of storing the updated profile in a profile database.

25. The non-transitory computer-readable medium of claim 21 wherein the computer program further causes the processing system to perform the step of retrieving customer account information from a customer account data warehouse.

26. The non-transitory computer-readable medium of claim 21 wherein the computer program further causes the processing system to perform the step of creating a new customer account profile for said customer.

27. The non-transitory computer-readable medium of claim 21, wherein k is chosen such that x decays to zero when δ exceeds a stated time period.

28. A method for transaction-based profiling of a customer, the method comprising:
preparing a transaction data file comprising transaction data for transactions performed by a customer with merchants in a predetermined time period;
obtaining a profile of said customer, said profile comprising a time-sensitive variable having a stored value;
periodically calculating an updated value based on the stored value of said time-sensitive variable obtained from said profile, a time function, and said transaction data;
assigning using a specially programmed processor said updated value to said time-sensitive variable;
using said updated value to identify at least one target customer having a predetermined characteristic; and transmitting a marketing communication to said at least one target customer, wherein the time function comprises an exponential decay function defined as:

$$x = xe^{-k\delta} + y$$

wherein x is said time-sensitive variable, k is an aging constant, δ is a time variable based on a last qualifying transaction performed by the customer, and y is an incrementing variable.

29. The method of claim 28, wherein k is chosen such that x decays to zero when δ exceeds a stated time period.

* * * * *